US006795617B2

(12) United States Patent
Dinu et al.

(10) Patent No.: US 6,795,617 B2
(45) Date of Patent: Sep. 21, 2004

(54) OPTICAL DEVICE FOR GENERATING PULSED LIGHT

(75) Inventors: Mihaela Dinu, Freehold, NJ (US); Charles Kerbage, Berkeley Heights, NJ (US); Xiang Liu, Marlboro, NJ (US); Francesco Quochi, Quartu Sant'Elena (IT); Robert S. Windeler, Annandale, NJ (US); Chunhui Xu, Ithaca, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/426,900

(22) Filed: Apr. 30, 2003

(65) Prior Publication Data

US 2003/0219206 A1 Nov. 27, 2003

Related U.S. Application Data

(60) Provisional application No. 60/384,768, filed on May 31, 2002, and provisional application No. 60/377,370, filed on May 2, 2002.

(51) Int. Cl.[7] ................................................. G02B 6/26
(52) U.S. Cl. ......................................................... 385/42
(58) Field of Search ............................ 385/42, 48, 125; 264/1.24

(56) References Cited

U.S. PATENT DOCUMENTS

| | | | | |
|---|---|---|---|---|
| 4,701,012 A | * | 10/1987 | Kaiser | ........................... 398/79 |
| 5,153,887 A | * | 10/1992 | Krapchev | ........................ 372/3 |
| 5,889,904 A | * | 3/1999 | Pan et al. | ....................... 385/24 |
| 6,334,017 B1 | * | 12/2001 | West | ............................ 385/123 |
| 6,334,019 B1 | * | 12/2001 | Birks et al. | .................. 385/125 |
| 6,567,581 B2 | * | 5/2003 | Cao | ............................. 385/24 |

OTHER PUBLICATIONS

"Integrated All–Fiber Variable Attenuator Based on Hybrid Microstructure Fiber," by C. Kerbage, A. Hale, A. Yablon, R.S. Windeler, and B.J. Eggleton, Appl. Phys. Lett., vol. 79, No. 19, Nov. 5, 2001, pp. 3191–3193.

"Solton Self–Frequency Shift in a Short TaperedAir–Silica Microstructure Fiber," by X. Liu, C. Xu, W.H. Knox, J.K. Chandalia, B. J. eggleton, S.G. Kosinski, and R.S. Windeler, Optice Letters, vol. 26, No. 6, Mar. 5, 2001, pp. 358–360.

* cited by examiner

*Primary Examiner*—Tulsidas C. Patel

(57) ABSTRACT

An optical device including a microstructured fiber pumped by an external pulsed-light source. In one embodiment, the microstructured fiber includes two waist regions functioning as a tunable attenuator and a wavelength shifter, respectively. Output wavelength of the optical device is selected by attenuating the pump light in the first waist region and then passing the light through the second waist region to shift the pump energy to a new spectral band. An optical device of the invention configured with two or more microstructured fibers generates two or more synchronized pulsed beams, each at a different characteristic wavelength. Certain embodiments of the invention provide an inexpensive, compact, energy-efficient multi-wavelength synchronized pulsed-light source.

35 Claims, 5 Drawing Sheets

US 6,795,617 B2

OPTICAL DEVICE FOR GENERATING PULSED LIGHT

CROSS-REFERENCE TO RELATED APPLICATIONS

This application claims priority from (i) U.S. Provisional Patent Application No. 60/377,370, filed May 2, 2002, and entitled "Coulomb Dynamics of 1.3-$\mu$m Dots in Tunable Two-Color Pump-Probe Experiments Using a Microstructure Fiber Based Source" and (ii) U.S. Provisional Patent Application No. 60/384,768, filed May 31, 2002, and entitled "Tunable Light Source Based on Tapered Microstructured Fibers." The subject matter of this application is related to that of (i) U.S. patent application Ser. No. 09/692,955, filed Oct. 20, 2000, and entitled "Process for Fabricating Tapered Microstructured Fiber System and Resultant System" and (ii) U.S. patent application Ser. No. 10/128,622, filed Apr. 23, 2002, and entitled "Process for Fabricating Tapered Microstructured Fiber System and Resultant System," both of which are incorporated herein by reference.

BACKGROUND OF THE INVENTION

1. Field of the Invention

The present invention relates to light sources and, more specifically, to fiber-based pulsed-light sources.

2. Description of the Related Art

Pulsed-light sources are widely used in optical communications systems and various scientific applications. For example, multi-wavelength synchronized pulsed-light sources are often employed in materials characterization experiments. A multi-wavelength synchronized pulsed-light source generates two or more pulse trains, each at a different characteristic wavelength. In this specification, the term "characteristic wavelength" generally refers to a center wavelength (e.g., representing the highest power) in the spectral band corresponding to pulsed light. Different pulse trains generated by the synchronized pulsed-light source are synchronized with respect to each other, i.e., have fixed relative phases between the pulse trains and substantially identical pulse repetition rates. Characteristic wavelengths corresponding to different pulse trains can be changed (tuned) as necessary while the temporal synchronization is maintained.

A typical prior art multi-wavelength synchronized pulsed-light source is implemented using two or more optical parametric oscillators (OPOs), each pumped by the same laser source. An OPO is a device well known in the art that converts received light into light having a different characteristic wavelength. For example, a representative OPO may convert 20-nJ pulses at a fundamental wavelength of 0.8 $\mu$m from a Ti:Sapphire laser into about 2-nJ pulses, whose characteristic wavelength may be continuously varied between about 1.1 and 1.6 $\mu$m.

One problem with prior art multi-wavelength synchronized pulsed-light sources is that they are relatively expensive to implement primarily due to the cost associated with multiple OPOs. Another problem with said light sources is that the power conversion efficiency is relatively low, typically about 10%. Yet another problem with said light sources is their relatively large size, typically about 1×2×4 ft$^3$, which hampers their use in portable or integrated devices.

SUMMARY OF THE INVENTION

The problems in the prior art are addressed, in accordance with the principles of the present invention, by an optical device including a microstructured fiber pumped by an external pulsed-light source. In one embodiment, the microstructured fiber includes two waist regions functioning as a tunable attenuator and a wavelength shifter, respectively. Output wavelength of the optical device is selected by attenuating the pump light in the first waist region and then passing the light through the second waist region to shift the pump energy to a new spectral band. An optical device of the invention configured with two or more microstructured fibers generates two or more synchronized pulsed beams, each at a different characteristic wavelength. Certain embodiments of the invention provide an inexpensive, compact, energy-efficient multi-wavelength synchronized pulsed-light source.

According to one embodiment, the present invention is a device, comprising: a beam splitter adapted to receive an input light beam having a characteristic input wavelength and to divide said input beam into N sub-beams, where N≧2; and N structured fibers, each adapted to receive and convert a different sub-beam into an output beam having a characteristic output wavelength different from the characteristic input wavelength, wherein at least two characteristic output wavelengths are different.

According to another embodiment, the present invention is a device, comprising a structured fiber including a first section and a second section optically coupled to the first section, wherein: the structured fiber is adapted to receive an input light beam having a characteristic input wavelength and to generate an output beam having a characteristic output wavelength different from the characteristic input wavelength; the first section is designed to operate as a wavelength shifter; and the second section is designed to operate as a first attenuator.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
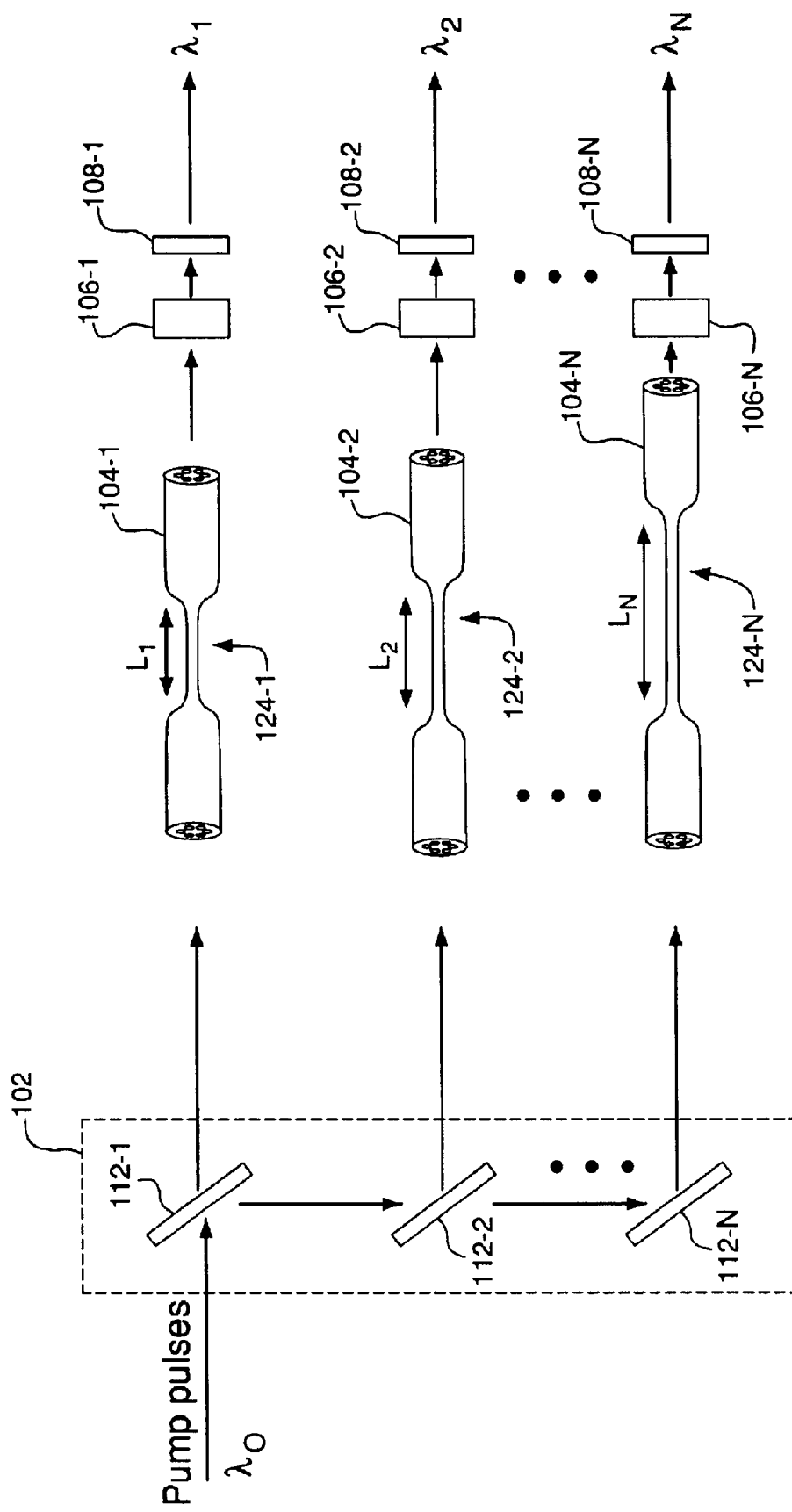
FIG. 1 schematically shows an optical device according to one embodiment of the present invention.

FIG. 1 schematically shows an optical device 100 that can be used in a multi-wavelength synchronized pulsed-light source according to one embodiment of the present invention. Device 100 is adapted to receive a train of pump pulses at wavelength $\lambda_0$, e.g., from a Ti:Sapphire laser (not shown) and generate N (N≧2) synchronized pulse trains at wavelengths $\lambda_1, \lambda_2, \ldots \lambda_N$, respectively.

In one embodiment, device 100 comprises a beam splitter 102, N fibers 104, N optional attenuators 106, and N long pass filters (LPFs) 108. Beam splitter 102 divides the pump beam into N sub-beams, each of which is then coupled into the corresponding fiber 104. In FIG. 1, beam splitter 102 is illustratively shown as implemented using free space optics and, more specifically, N-1 beam splitting plates 112-1–112-(N−1) and a terminal mirror 112-N. In different embodiments, beam splitter 102 implemented using fiber or waveguide optics may similarly be used.

Each fiber 104 is a tapered microstructured fiber similar to one of such fibers disclosed in the above-referenced U.S. patent application Ser. Nos. 09/692,955 and 10/128,622. Briefly, fiber 104 functions as a wavelength shifter and has a core region, a cladding region, and one or more axially oriented elements, e.g., capillary air holes, in the cladding region. In FIG. 1, each fiber 104 is illustratively shown as having six axial air holes. A portion of fiber 104 is treated by heating and stretching the fiber to form a waist region 124, in which the outer diameter of the fiber and cross-sections of the core region, cladding region, and axial air holes are reduced. In device 100, different fibers 104 preferably have waist regions 124 of different lengths (labeled $L_1, L_2, \ldots, L_N$ in FIG. 1).

A detailed description of wavelength (frequency) shift induced by fiber 104 can be found for example in Optics Letters, 2001, Vol. 26, No. 6, pp. 358–360, the teachings of which are incorporated herein by reference. Briefly, soliton-shaped pulses propagating in fiber 104 undergo a continuous downshift of their carrier frequency due to intra-pulse stimulated Raman scattering (ISRS). The ISRS is a nonlinear optical effect that transfers the high-frequency part of the pulse spectrum to the low-frequency part. As a result, the carrier frequency is downshifted and the corresponding characteristic wavelength is red-shifted. In fiber 104, the ISRS primarily occurs in waist region 124 due to the lateral mode contraction that significantly increases light intensity (and hence the ISRS) in the waist region compared to that in the rest of the fiber. The magnitude of the frequency downshift (wavelength red-shift) is primarily determined by the length of waist region 124, the pump power coupled into fiber 104, and the relative increase of the light intensity in the waist region.

Figure 2:
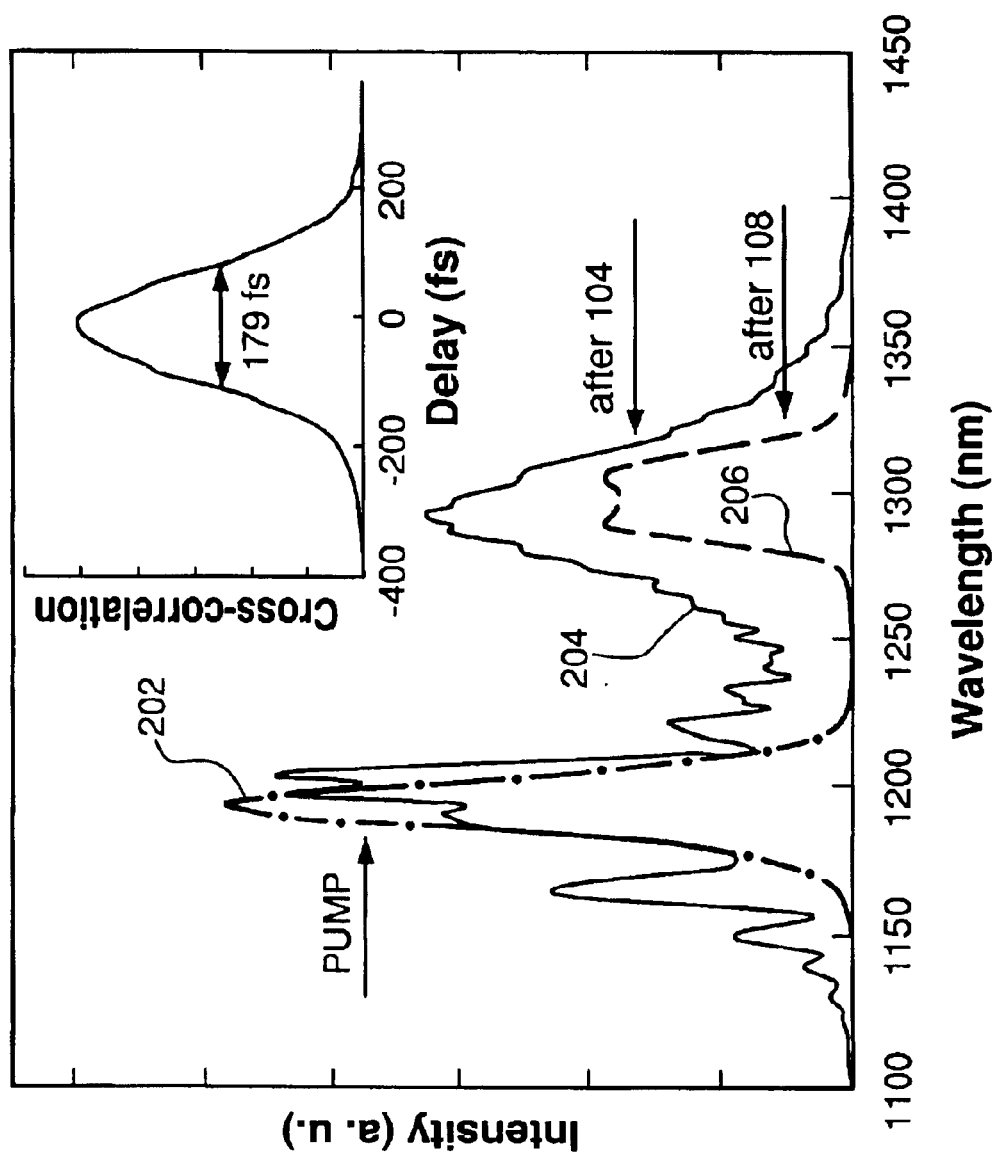
FIGS. 2–4 graphically illustrate wavelength red-shift in a tapered microstructured fiber used in the optical device of FIG. 1.
Figure 4:
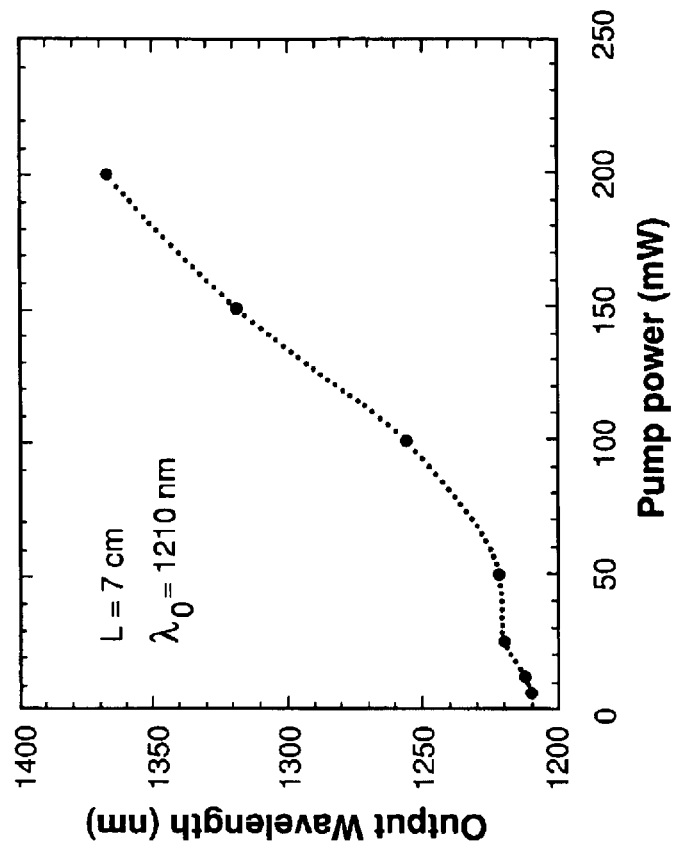
Figure 3:
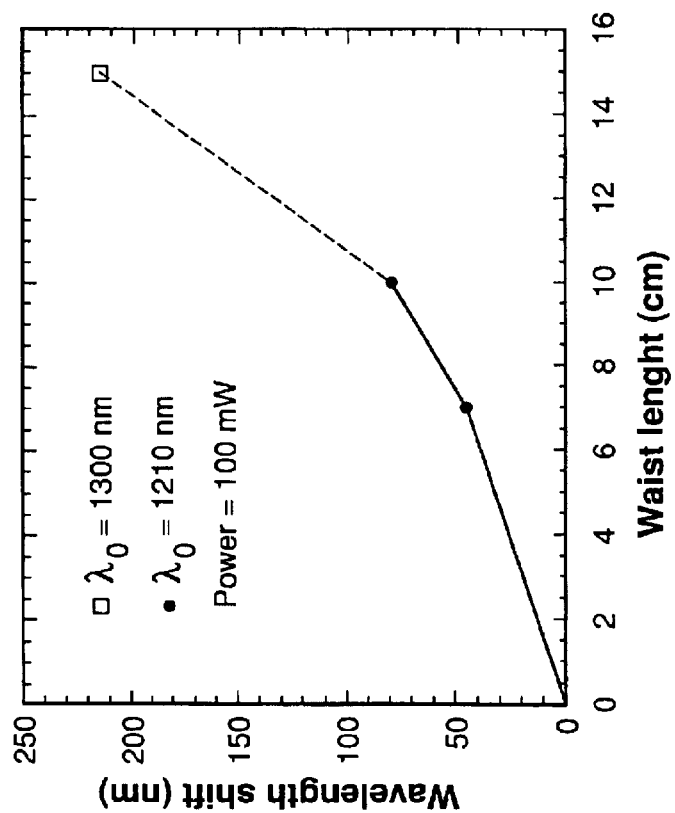

FIGS. 2–4 graphically illustrate wavelength red-shift due to the ISRS in fiber 104. More specifically, FIG. 2 shows spectral and temporal characteristics of light pumped into and coming out of fiber 104; FIG. 3 shows wavelength red-shift as a function of the length of waist region 124; and FIG. 4 shows wavelength red-shift as a function of the pump power.

Referring to FIG. 2, dash-dotted curve 202 shows a spectrum of pulsed light pumped into fiber 104 having waist region 124 that is 10 cm in length. More specifically, said spectrum includes a spectral band centered at about $\lambda_0=1190$ nm and having a total power of about 100 mW (at 76 MHz pulse repetition rate and 140 fs pulse full-width at half-maximum (FWHM)). Solid curve 204 represents the spectrum of that light after passing through said fiber 104. As indicated by curve 204, over 50% of the light's energy is transferred to a new spectral band located at about 1300 nm, while the remaining energy is spread over several spectral bands located in the vicinity of the original spectral band (curve 202). The shape of pulses emitted by fiber 104 is illustrated in the inset of FIG. 2 showing cross-correlation between the pump and output light. Typically, when a soliton-shaped pulse is received by fiber 104, a similarly shaped pulse is produced. Dashed curve 206 represents the spectrum of the light of curve 204 after it has been filtered using a band-pass filter centered at about 1300 nm. A spectrum similar to that indicated by curve 206 may also be obtained using a corresponding LPF 108 (FIG. 1), e.g., designed to remove light of wavelength shorter than about 1250 nm.

FIG. 3 shows measurements of wavelength red-shift for three different fibers 104 having waist regions 124 that are about 7, 10, and 15 cm in length, respectively. The measurements were carried out at two different pump wavelengths ($\lambda_0$), while the pump power was fixed at about 100 mW. The two solid dots and one empty square in FIG. 3 correspond to $\lambda_0$ of 1210 and 1300 nm, respectively. As indicated by FIG. 3, wavelength red-shift increases monotonically with the length of waist region 124. Therefore, with the pump power fixed, the output wavelength can be selected by selecting fiber 104 having the corresponding appropriate length of waist region 124.

FIG. 4 shows the dependence of the output wavelength on the pump power for fiber 104 having waist region 124 that is about 7 cm in length for $\lambda_0=1210$ nm. As indicated by FIG. 4, with the length and cross-section of waist region 124 fixed, the output wavelength can be selected by adjusting the pump power. For example, the output wavelength changes by (i) about 0.2 nm/mW between 0 and 50 mW and (ii) about 1 nm/mW between 50 and 200 mW.

FIGS. 2–4 indicate that, for the particular pump power and depending on the desired output wavelength at each output port, device 100 can be suitably designed by (i) selecting appropriate splitting plates 112 and (ii) using appropriate fibers 104, e.g., each having the corresponding appropriate length and cross-section of waist region 124. Each filter 108 is then selected to pass the desired wavelengths output from the corresponding fiber 104 and remove undesired (e.g., shorter) wavelengths.

Figure 5A:
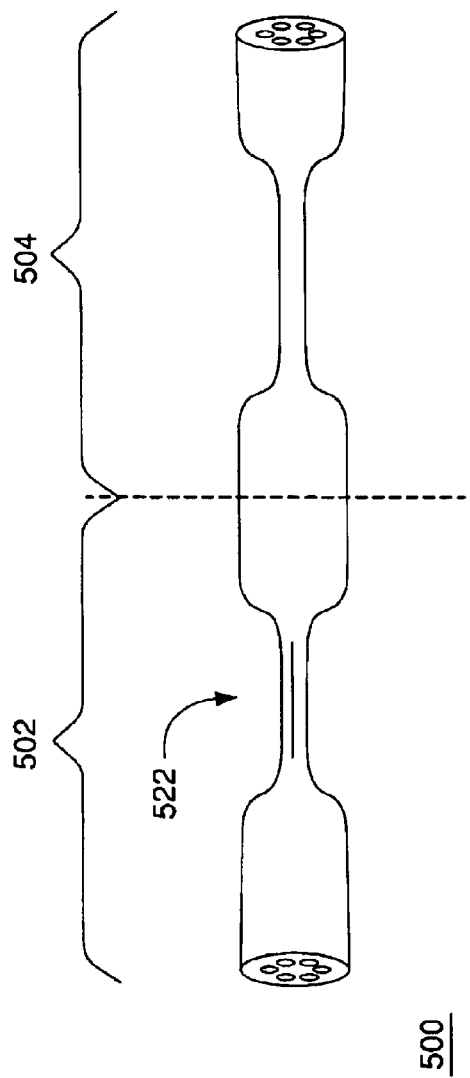
FIGS. 5A–B schematically show a tapered microstructured fiber that can be used in the optical device of FIG. 1 according to another embodiment of the present invention.
Figure 5B:
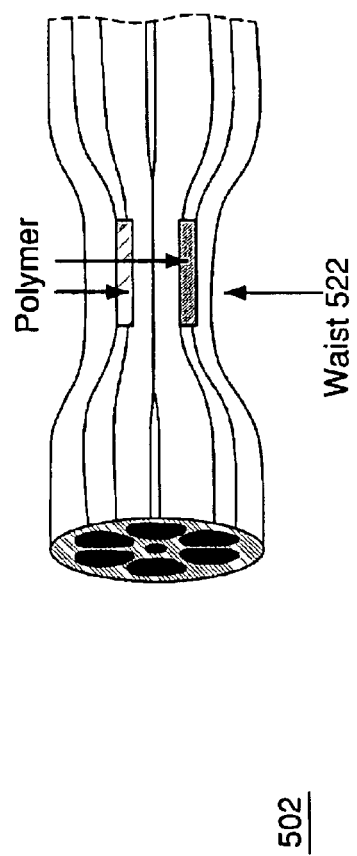

FIGS. 5A–B schematically show a tapered microstructured fiber 500 that can be used as fiber 104 in device 100 of FIG. 1 according to another embodiment of the present invention. Fiber 500 comprises two sections 502 and 504 spliced together. Functionally, section 502 is a variable attenuator (loss filter), the attenuation of which is determined by the temperature of waist region 522, and section 504 is a wavelength shifter similar to above-described fiber 104 (FIGS. 1–4).

A detailed description of the principle of operation and methods of fabrication of fibers similar to section 502 of fiber 500 can be found, for example, in Applied Physics Letters, 2001, Vol. 79, No. 19, pp. 3191–3193, the teachings of which are incorporated herein by reference. Briefly, section 502 is a tapered microstructured fiber similar to fiber 104, in which a special material, preferably a polymer, is incorporated into the air holes of a waist region 522 as shown in more detail in FIG. 5B. For example, a polymer belonging to a group of materials whose index of refraction changes relatively strongly with temperature may be used. More specifically, the corresponding thermal coefficient, $\Delta n/\Delta T$, where n and T are the index of refraction and temperature, respectively, for the polymer may be approximately an order of magnitude larger than that of the fiber material (typically silica) in the temperature range of interest, e.g., from 0 to 200° C.

The principle of operation for section 502 can be briefly summarized as follows. When the index of refraction of the polymer is lower than that of the fiber core, the fiber mode is primarily confined to the core and propagates through waist region 522 with only a nominal loss. On the other hand, when the index of refraction of the polymer is close to or exceeds that of the fiber core, the fiber mode will expand laterally into the polymer and propagate with a significant loss. The index of refraction contrast between the core and the polymer controls the extent of mode expansion and, thereby, the attenuation induced by section 502. Therefore, changing the temperature of waist region 522 will change the attenuation.

Figure 6:
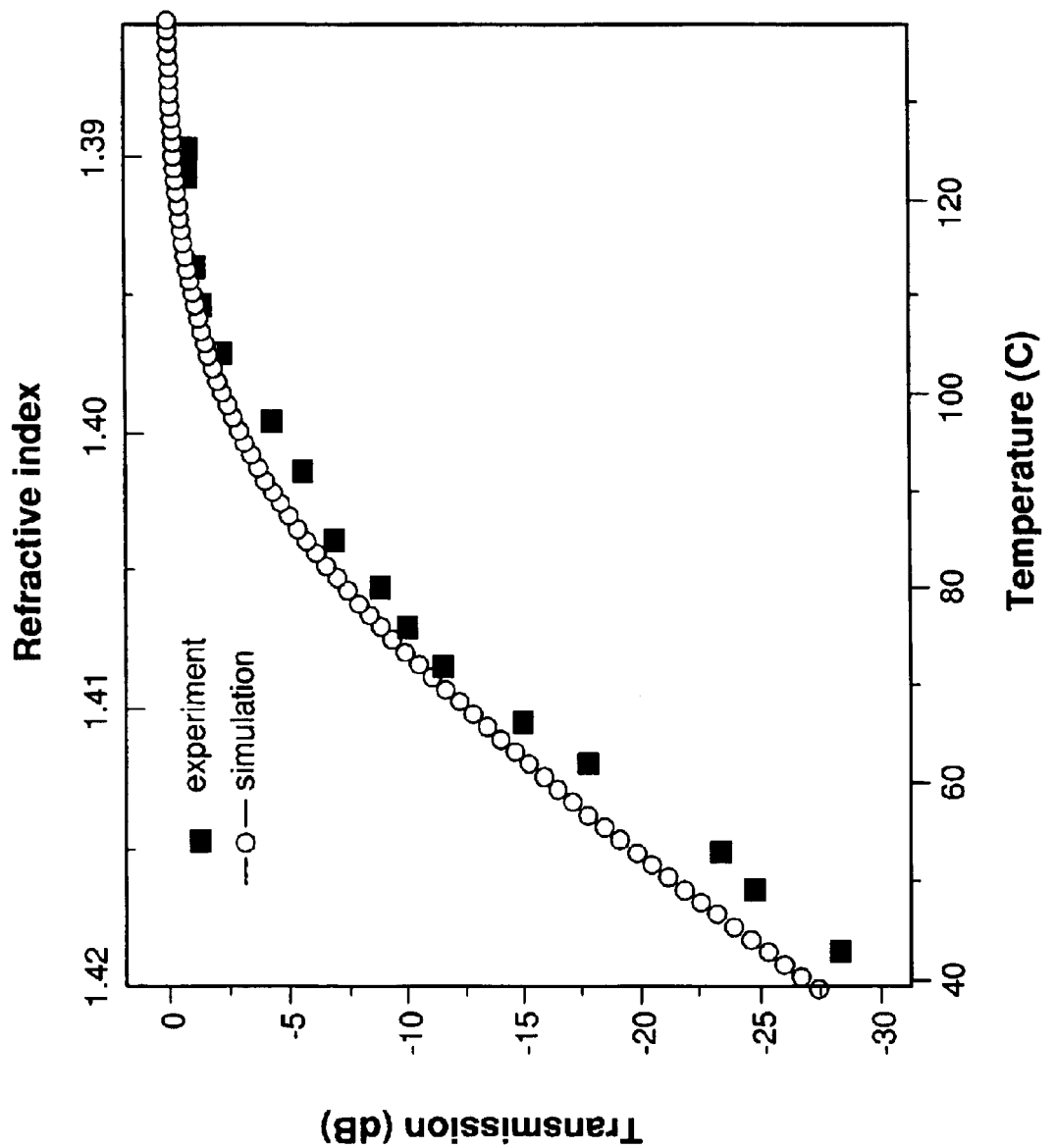
FIG. 6 graphically illustrates representative transmission properties of a fiber section for the fiber of FIG. 5.

FIG. 6 graphically illustrates representative transmission properties of section 502 for $\lambda_0=1.55$ μm in the temperature range from 40 to 140° C. As indicated by FIG. 6, section 502 produces tunable attenuation in the range from about 0 to about 30 dB.

When used in device 100 (FIG. 1) in place of fiber 104, fiber 500 provides a simple and convenient way to tune the corresponding output wavelength. More specifically, since wavelength red-shift produced by section 504 is a function of the injected power (FIG. 4), the output wavelength can be changed by changing the attenuation introduced in section 502. The corresponding attenuator 106 (FIG. 1) may then be used to remove the dependence of the power output from section 504 on the output wavelength. For example, section 502 and attenuator 106 may be configured to have a constant cumulative loss. In particular, when the loss introduced by section 502 changes, the loss introduced by attenuator 106 is adjusted accordingly to keep the sum of the losses constant. In one embodiment, attenuator 106 includes a fiber section similar to section 502 that may optionally be spliced with fiber 500 or fiber 104.

Certain embodiments of the present invention provide a multi-wavelength synchronized pulsed-light source characterized by one or more of the following: (1) relatively low cost; (2) relatively small dimensions; (3) relatively high pump power conversion efficiency; (4) all-fiber implementation; and (5) independent wavelength tunability for different output beams.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. For example, optical devices of the invention can be designed for use with different pump sources, e.g., having different fundamental wavelengths, pulse shapes, repetition rates, etc. Appropriate feedback loops may be used, as known in the art, to stabilize the corresponding output wavelengths and/or powers. Sections 502 and 504 of fiber 500 may be formed using the same microstructured fiber or two or more different fibers. Furthermore, sections 502 and 504 of fiber 500 and attenuator 106 may be fabricated using a single microstructured fiber. Various temperature-control methods, e.g., resistive heating and/or thermoelectric cooling, may be used to control attenuation produced in section 502. Appropriate delay lines may be used to control relative phases of the generated synchronized pulse trains. Although optical devices of the invention were described as adapted to operate with pulse trains, one skilled in the art will appreciate that such optical devices may also be adapted to operate with single pulses. Although certain optical devices of the invention were described as having multiple fibers 500, such optical devices may also be designed to have one such fiber.

What is claimed is:

1. A device, comprising:
   a beam splitter adapted to receive an input light beam having a characteristic input wavelength and to divide said input beam into N sub-beams, where N≧2; and
   N structured fibers, each adapted to convert a different sub-beam into an output beam having a characteristic output wavelength different from the characteristic input wavelength, wherein at least two characteristic output wavelengths are different.

2. The device of claim 1, wherein:
   when the input beam comprises a plurality of input pulses, the device is adapted to generate, for each output beam, a plurality of output pulses corresponding to the plurality of input pulses; and
   at least two pluralities of output pulses corresponding to different output beams are synchronized with respect to each other.

3. The device of claim 1, wherein each structured fiber comprises a first section designed to operate as a wavelength shifter.

4. The device of claim 3, wherein the first section comprises:
   a core region, a cladding region, and one or more axially oriented elements in the cladding region; and
   a waist region, wherein portions of the core region, the cladding region, and the one or more axially oriented elements corresponding to the waist region are modified to induce energy transfer from a spectral band corresponding to the input beam to a spectral band corresponding to the output beam.

5. The device of claim 4, wherein the one or more axially oriented elements include one or more cavities filled with air.

6. The device of claim 4, wherein the waist regions corresponding to at least two different structured fibers have different lengths.

7. The device of claim 3, wherein at least one structured fiber comprises a second section optically coupled to the first section and designed to operate as a first attenuator.

8. The device of claim 7, wherein the at least one structured fiber further comprises a third section optically coupled to the first section and designed to operate as a second attenuator.

9. The device of claim 7, wherein the second section comprises:
   a core region, a cladding region, and one or more axially oriented elements in the cladding region;
   a waist region, wherein portions of the core region, the cladding region, and the one or more axially oriented elements corresponding to the waist region are modified to change at least one of the respective cross-sections in the waist region compared to the corresponding cross-sections in the rest of the second section; and
   the one or more axially oriented elements corresponding to the waist region include a material configured to control lateral dimension of a fiber mode in the waist region.

10. The device of claim 9, wherein:
    the core region and the cladding region comprise silica; and
    the material is a polymer whose change in index of refraction over a temperature interval is substantially different from a corresponding change in index of refraction over the temperature interval in the silica.

11. The device of claim 9, wherein the lateral dimension is determined by the temperature of the waist region.

12. The device of claim 1, further comprising N long-pass filters, each optically coupled to a corresponding structured fiber and designed to remove wavelengths corresponding to the input beam and pass wavelengths corresponding to the output beam.

13. A device, comprising a structured fiber including a first section and a second section optically coupled to the first section, wherein:
the structured fiber is adapted to receive an input light beam having a characteristic input wavelength and to generate an output beam having a characteristic output wavelength different from the characteristic input wavelength;
the first section is designed to operate as a wavelength shifter; and
the second section is designed to operate as a first variable attenuator.

14. The device of claim 13, wherein the structured fiber further comprises a third section optically coupled to the first section and designed to operate as a second attenuator.

15. The device of claim 13, wherein the first section comprises:
a core region, a cladding region, and one or more axially oriented elements in the cladding region; and
a waist region, wherein portions of the core region, the cladding region, and the one or more axially oriented elements corresponding to the waist region are modified to induce energy transfer from a spectral band corresponding to the input beam to a spectral band corresponding to the output beam.

16. The device of claim 13, wherein the second section comprises:
a core region, a cladding region, and one or more axially oriented elements in the cladding region;
a waist region, wherein portions of the core region, the cladding region, and the one or more axially oriented elements corresponding to the waist region are modified to change at least one of the respective cross-sections in the waist region compared to the corresponding cross-sections in the rest of the second section; and
the one or more axially oriented elements corresponding to the waist region include a material configured to control lateral dimension of a fiber mode in the waist region.

17. The device of claim 16, wherein:
the core region and the cladding region comprise silica; and
the material is a polymer whose change in index of refraction over a temperature interval is substantially different from a corresponding change in index of refraction over the temperature interval in the silica.

18. The device of claim 16, wherein the lateral dimension is determined by the temperature of the waist region.

19. The device of claim 13, wherein the first and second sections are fabricated from a single fiber.

20. The device of claim 13, wherein, when the input beam comprises a plurality of input pulses, the device is adapted to generate the output beam comprising a plurality of output pulses synchronized with the plurality of input pulses.

21. A method of generating light, comprising:
dividing an input light beam having a characteristic input wavelength into N sub-beams, where $N \geq 2$; and
for each sub-beam, converting the sub-beam into an output beam having a characteristic output wavelength different from the characteristic input wavelength using a corresponding structured fiber, wherein at least two characteristic output wavelengths are different.

22. A device, comprising:
means for dividing an input light beam having a characteristic input wavelength into N sub-beams, where $N \geq 2$; and
for each sub-beam, fiber means for converting the sub-beam into an output beam having a characteristic output wavelength different from the characteristic input wavelength, wherein at least two characteristic output wavelengths are different.

23. The device of claim 1, wherein each sub-beam has the characteristic input wavelength.

24. The method of claim 21, wherein each sub-beam has the characteristic input wavelength.

25. The device of claim 22, wherein each sub-beam has the characteristic input wavelength.

26. The device of claim 1, wherein:
the characteristic input wavelength is a wavelength corresponding to maximum power in a spectral band of the input light beam; and
for each output beam, the characteristic output wavelength is a wavelength corresponding to maximum power in a spectral band of the output beam.

27. The method of claim 21, wherein:
the characteristic input wavelength is a wavelength corresponding to maximum power in a spectral band of the input light beam; and
for each output beam, the characteristic output wavelength is a wavelength corresponding to maximum power in a spectral band of the output beam.

28. The device of claim 22, wherein:
the characteristic input wavelength is a wavelength corresponding to maximum power in a spectral band of the input light beam; and
for each output beam, the characteristic output wavelength is a wavelength corresponding to maximum power in a spectral band of the output beam.

29. The device of claim 14, wherein:
the second attenuator is a variable attenuator; and
the first and second attenuators are adapted to be controlled to keep a sum of losses introduced by said attenuators at a selected constant level.

30. The device of claim 7, wherein the first attenuator is a variable attenuator.

31. The device of claim 8, wherein the first and second attenuators are variable attenuators adapted to be controlled to keep a sum of losses introduced by said attenuators at a selected constant level.

32. The method of claim 21, wherein:
at least one structured fiber comprises:
a first section designed to operate as a wavelength shifter;
a second section optically coupled to the first section and designed to operate as a first variable attenuator; and
a third section optically coupled to the first section and designed to operate as a second variable attenuator; and
the method comprises controlling the first and second variable attenuators to keep a sum of losses introduced by said attenuators at a selected constant level.

33. The device of claim 1, wherein, for at least one output beam, the characteristic output wavelength is not present in the input beam.

34. The method of claim 21, wherein, for at least one output beam, the characteristic output wavelength is not present in the input beam.

35. The device of claim 22, wherein, for at least one output beam, the characteristic output wavelength is not present in the input beam.

* * * * *